(12) United States Patent
Colom

(10) Patent No.: US 10,927,951 B2
(45) Date of Patent: Feb. 23, 2021

(54) SHIFT BY WIRE SHIFTER DEVICE

(71) Applicant: Fico Triad, S.A., Barcelona (ES)

(72) Inventor: Javier Moreno Colom, Barcelona (ES)

(73) Assignee: FICO TRIAD, S.A., Barcelona (ES)

( * ) Notice: Subject to any disclaimer, the term of this patent is extended or adjusted under 35 U.S.C. 154(b) by 99 days.

(21) Appl. No.: 16/126,489

(22) Filed: Sep. 10, 2018

(65) Prior Publication Data
US 2019/0078682 A1    Mar. 14, 2019

(30) Foreign Application Priority Data

Sep. 8, 2017 (EP) ...................................... 17382600

(51) Int. Cl.
| | |
|---|---|
| *F16H 61/02* | (2006.01) |
| *F16H 59/10* | (2006.01) |
| *F16H 61/22* | (2006.01) |
| *F16H 61/24* | (2006.01) |
| *F16H 59/02* | (2006.01) |
| *F16H 59/08* | (2006.01) |

(52) U.S. Cl.
CPC ....... *F16H 61/0204* (2013.01); *F16H 59/105* (2013.01); *F16H 61/22* (2013.01); *F16H 61/24* (2013.01); *F16H 2059/0295* (2013.01); *F16H 2059/081* (2013.01); *F16H 2061/243* (2013.01)

(58) Field of Classification Search
CPC .. F16H 59/08; F16H 2059/081; F16H 59/044; F16H 59/0204; F16H 61/24; F16H 2061/243; F16H 2059/047; F16H 2061/242; F16H 2061/247
See application file for complete search history.

(56) References Cited

U.S. PATENT DOCUMENTS

| | | | | |
|---|---|---|---|---|
| 7,829,805 B2 * | 11/2010 | Ersoy | ..................... | F16H 59/044 200/61.88 |
| 8,413,533 B2 * | 4/2013 | Rake | ..................... | F16C 11/068 74/473.12 |
| 8,760,152 B2 * | 6/2014 | Uhlenbruck | .......... | F16H 59/044 324/207.2 |
| 9,254,745 B2 * | 2/2016 | Tokumo | ................. | B60K 20/02 |
| 9,291,259 B2 | 3/2016 | Watanabe | | |

(Continued)

FOREIGN PATENT DOCUMENTS

| | | |
|---|---|---|
| DE | 102006021078 B3 | 8/2007 |
| EP | 1655516 A2 | 5/2006 |

(Continued)

OTHER PUBLICATIONS

European Search Report for Application No. 17382600.9, dated Jun. 5, 2018, 16 pages.

*Primary Examiner* — Bobby Rushing, Jr.
(74) *Attorney, Agent, or Firm* — Brooks Kushman P.C.

(57) ABSTRACT

The shift by wire shifter device comprises a selector that is movable relative to a fixed part according to a first shifting movement defined by a first shifting path and according to a second shifting movement defined by a second shifting path for selecting gearshift positions. One or both shifting paths extends from different gearshift positions. The selector and the fixed part are directly joined by a joint member such that the first shifting movement is a translational movement and the second shifting movement is a rotational movement, with the first and second shifting paths lying on the same plane.

17 Claims, 4 Drawing Sheets

(56) References Cited

U.S. PATENT DOCUMENTS

| | | | | |
|---|---|---|---|---|
| 9,334,952 B2* | 5/2016 | Tokumo | ............... | F16H 59/08 |
| 9,494,228 B2* | 11/2016 | Hermansson | ....... | F16H 59/0204 |
| 9,568,092 B2* | 2/2017 | Derouet | ............. | F16H 59/0204 |
| 2016/0146333 A1 | 5/2016 | Jeon | | |
| 2017/0059034 A1* | 3/2017 | Makimura | .......... | F16H 59/0278 |
| 2017/0122429 A1* | 5/2017 | Kvarnstrom | ........ | F16H 59/0204 |

FOREIGN PATENT DOCUMENTS

| | | |
|---|---|---|
| EP | 1958812 A1 | 8/2008 |
| EP | 3184860 A2 | 6/2017 |
| JP | 2008132932 A | 6/2008 |
| WO | 2004005765 A1 | 1/2004 |
| WO | 2015139740 A1 | 9/2015 |
| WO | 2017036539 A1 | 3/2017 |

* cited by examiner

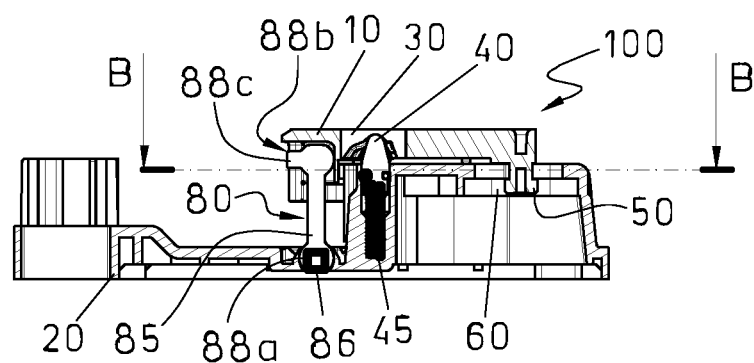
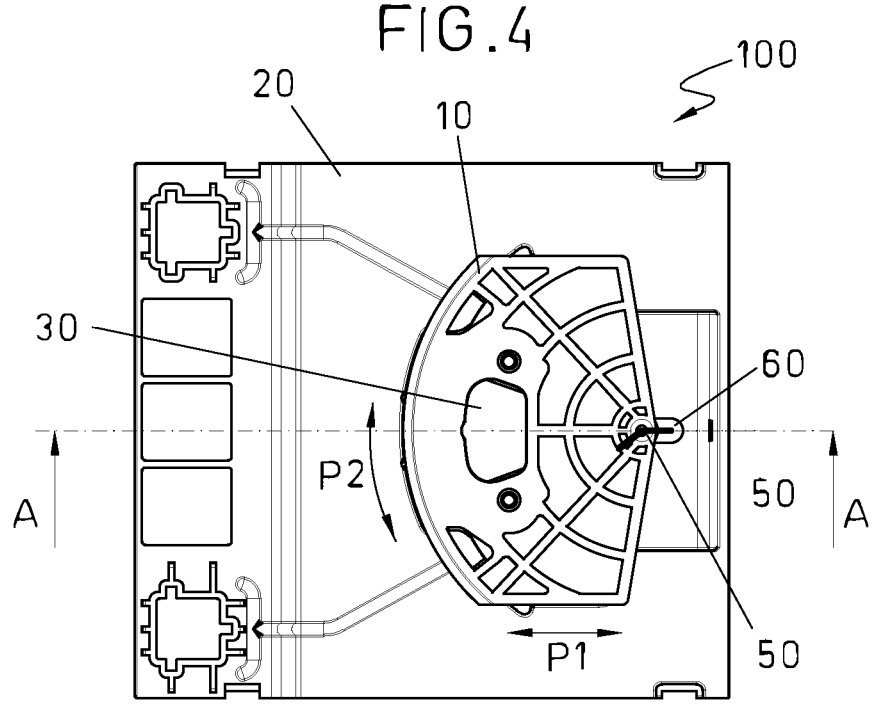

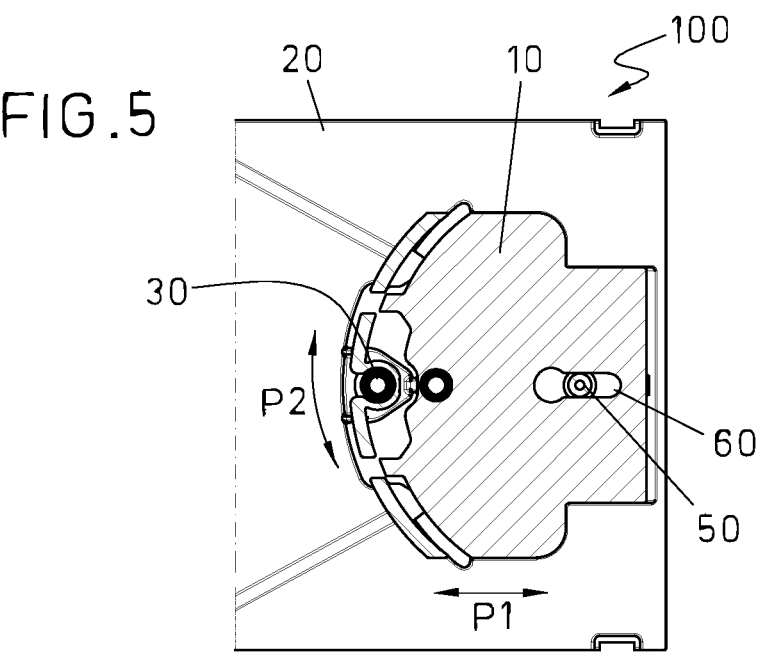
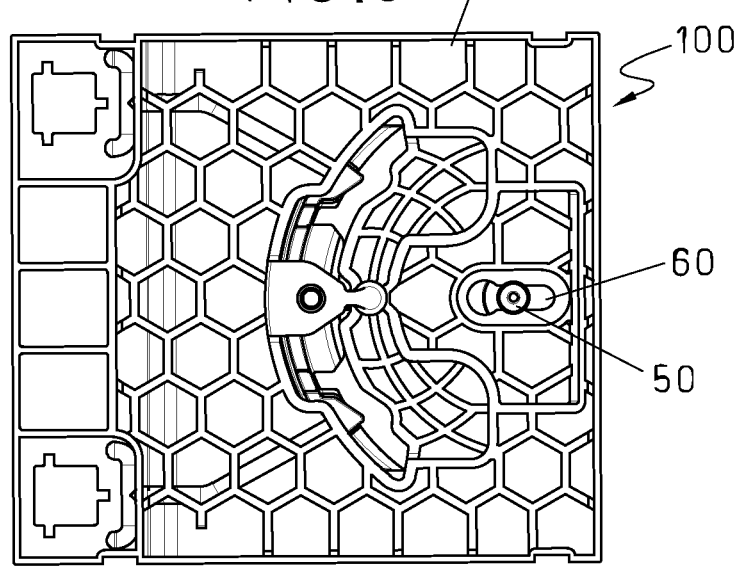

FIG.7a  FIG.7b  FIG.7c
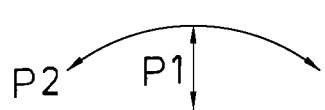 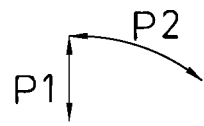 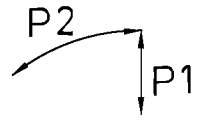
FIG.7d  FIG.7e  FIG.7f
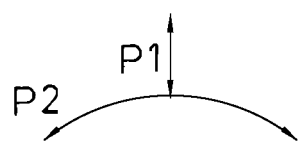 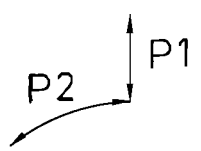 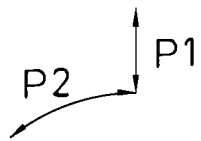
FIG.7g  FIG.7h  FIG.7i
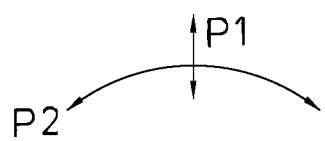 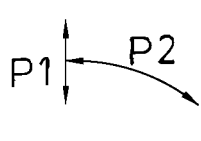 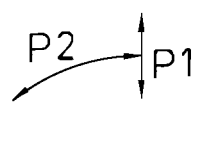
FIG.7j  FIG.7k
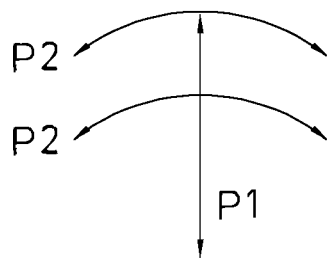 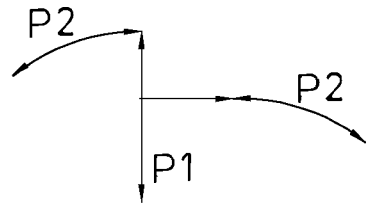

SHIFT BY WIRE SHIFTER DEVICE

CROSS-REFERENCE TO RELATED APPLICATIONS

This application claims priority from EP 17382600.9 filed Sep. 8, 2017, the disclosure of which is hereby incorporated in its entirety by reference herein.

TECHNICAL FIELD

The present disclosure relates to shifter devices comprising a selector movable for selecting different gearshift positions for controlling a vehicle transmission.

BACKGROUND

Shift by wire shifter devices for electronically controlling a vehicle automatic transmission are known in the art. Such shifter devices are configured to convert a shifting operation when a selector is actuated into an electric shifting signal for controlling a vehicle transmission.

The selector may be, for example, a selector lever that can be pivoted for selecting a specific gearshift position. In this case, when certain different operating conditions have to be selected, the shift lever has to be manually move in different shifting channels.

In other shift by wire shifter devices, the selector may be, for example, a rotary switch that can be rotated for selecting a specific gearshift position. In this case, when certain different operating conditions have to be selected, the rotary switch can be rotated and also pushed. For example, the rotary switch can be rotated to select reverse and drive gearshift positions, and the rotary switch can be also pushed for setting and releasing the parking brake.

U.S. Pat. No. 9,291,259 discloses one example of a rotary shift by wire shifter device where the selector can be rotated and pushed. A return unit is provided that is configured to return the rotary shift to a stable position when it has been rotated from the position. A push restriction unit is configured to restrict pushing and rotation of the rotary shift.

EP1655516 also shows a shift by wire shifter device for electronically controlling an automatic transmission of a vehicle between a parking state and a shift state. The shift by wire shifter device comprises a shift knob that can be rotated and pushed, a push detecting switch for detecting a pushed state and a non-pushed state of the shift knob, a pop-up tool for popping up the shift knob, and a control unit for controlling an automatic transmission based on the rotated and pushed state of the shift knob or controlling the pop-up tool based on a predetermined operation of the shift knob and the operation of the brake. When the brake is operated by a driver and the push switch is turned on, the actuator lifts up the shift knob.

There is still a need for shifter devices of the above type whose configuration and structure are highly simplified, with reduced parts involved for reducing manufacturing costs.

SUMMARY

The present shift by wire shifter device has been shown to solve the above problem while at the same time provides additional advantages.

The description will be given applied to general shift by wire shifter devices or to the so-called e-shifters for electronically controlling a vehicle transmission. The present shift by wire shifter device can be used in shift by wire shifter devices of the so called multistable type and the monostable type, and also in combinations of the types of shifter devices.

In multistable shift by wire shifter devices, multiple stable positions are defined for selecting a specific gearshift position. In monostable shift by wire shifter devices, a stable gearshift position is defined into which a selector automatically returns after the selector has been moved by the user for selecting a specific gearshift position. When such specific gearshift position has been selected, a gearshift signal is sent to a control unit to drive the vehicle transmission accordingly and the selector automatically returns to the stable position.

The present shift by wire shifter device finds advantageous application in shift by wire shifter devices of the monostable type.

The selector in the present shift by wire shifter device is movable relative to a fixed part. The fixed part may be formed in or be part of, for example, a shifter device housing. The selector is movably mounted to the fixed part such that the selector can be moved according to a first shifting movement defined by a first shifting path and according to a second shifting movement defined by a second shifting path for selecting gearshift positions. At least one of the shifting paths extends from different gearshift positions.

The selector and the fixed part are directly joined by a joint member such that the first shifting movement is a translational movement and the second shifting movement is a rotational movement. The first and second shifting paths that define the above mentioned first and second shifting movements lie on the same plane.

It may be preferred that at least one of the fixed part and the selector is made of one-piece construction. In one preferred example of the present shift by wire shifter device, the selector is made of one-piece construction.

The first and second shifting paths intersect with each other. In some cases, intersection between the shifting paths may define a gearshift position. The gearshift position may be a stable gearshift position where the selector remains once selected by the user, or the gearshift position may be an unstable gearshift position into which the selector automatically returns to a stable position once a given gearshift position has been selected by the user.

One aspect to note is that the selector and the fixed part are directly joined to each other by a joint member. The joint member may for example comprise a pivot pin projecting from one of the selector and the fixed part. The joint member is intended to slide along a slot formed in the other of the fixed part and the selector as the selector is actuated to perform the first shifting movement. In one example, the pivot pin is formed in or attached to the selector projecting therefrom, and the slot, along which the pivot pin is allowed to slide as the selector is actuated to perform the first shifting movement, is formed in the fixed part. The pivot pin is also adapted to be rotated in the slot as the selector is actuated to perform the second shifting movement.

Within the meaning of the present disclosure, the fact that the selector and the fixed part are directly joined to each other means that no other intermediate parts are provided for joining the selector and the fixed part other than the above mentioned joint member.

The selector and the fixed part are joined such that the first shifting movement is a translational movement defined by the first shifting path and such that the second shifting movement is a rotational movement defined by the second shifting path relative to the position of the joint member. In any case, the particular types of shifting movements that the selector is allowed to perform depend upon the particular configuration of the slot that is formed in the fixed part or the selector.

The first shifting path P1 may be defined by a straight line although many other path shapes are of course possible. The second shifting path may be defined by a curved line such as, for example, circular, elliptical, oval or a combination thereof. In any case, the first shifting movement and the second shifting movement are performed in the same plane.

The shifter device may further comprise a feeling element for providing the user with a gear shifting feeling during use, that is, as the selector is actuated. The feeling element has a contoured surface adapted to be contacted by a follower finger. Thus, as the selector is moved to perform at least one of the first shifting movement or the second shifting movement a gear shifting feeling is provided to the user. The feeling element may be attached to or formed integral with one of the selector and the fixed part. The follower finger may be attached to or formed integral with the other of the selector and the fixed part. In one example, the feeling element may have a first channel adapted to be contacted by the follower finger as the selector is moved to perform the first shifting movement, and a second channel with a contoured surface adapted to be contacted by the follower finger as the selector is moved to perform the second shifting movement.

Locking mechanisms are provided to prevent the selector from being actuated to perform one of the first and second shifting movements when the selector is actuated to perform the other of the first and second shifting movements. In one example, the locking mechanism may comprise a projection formed in one of the selector and the fixed part, and a groove formed in the other of the selector and the fixed part along which the projection can be moved as the selector is actuated to perform the first or the second shifting movement.

The present shifter device may further include a selector position sensing mechanism. The selector position sensing mechanism may be of the magnetic type comprising a lever attached to the selector at one end thereof and a magnet attached to the lever at another end thereof. The selector position sensing mechanism may further include a sensor, such as for example a 3D sensor, located proximate the magnet for determining the position of the selector. In one example, the sensor may be located in the fixed part.

At least one of the coupling of the lever with the selector and the coupling of the magnet to the fixed part may be through corresponding ball and socket joints. At least one of such ball and socket joints may include an anti-rotation mechanism.

With a single moving part, that is, the selector, and with a single fixed part, a simple and efficient shifting pattern is obtained, with two different shifting movements of the selector being allowed to efficiently control a vehicle transmission. The present gearshift device is advantageously very simple due to its constructional simplicity and very efficient in use with the position of the selector being accurately determined by using a 3D sensor.

Additional objects, advantages and features of examples of the present shift by wire shifter device will become apparent to those skilled in the art upon examination of the description or may be learned by practice thereof.

BRIEF DESCRIPTION OF THE DRAWINGS

Particular examples of the present shift by wire shifter device will be described in the following by way of non-limiting examples, with reference to the appended drawings, in which:

FIG. 3 is an elevational sectional view of the shift by wire shifter device in FIGS. 1 and 2 taken along line AA in FIG. 4;

FIG. 4 is a top plan view of the shift by wire shifter device in FIGS. 1-3;

FIG. 5 is a top sectional view of the shift by wire shifter device in FIGS. 1-4 taken along line BB in FIG. 3;

FIG. 6 is a bottom view of the shift by wire shifter device in FIGS. 1-5; and FIGS. 7*a-k* are graphical schemes showing examples of different patterns according to different relative positions of the shifting movements.

DETAILED DESCRIPTION

Figure 1:
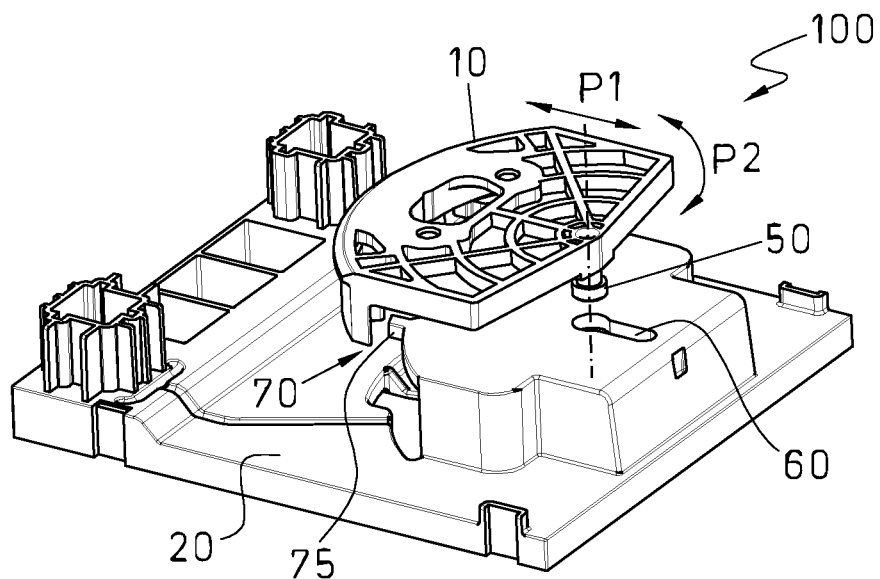
FIG. 1 is a general perspective view of one example of the present shift by wire shifter device.

The figures show non-limiting examples of the present shift by wire shifter device 100. In the examples, a monostable shift by wire shifter device 100 has been illustrated. However, the present description may be applied to other types of shifter devices, such as, bi-stable, multistable or combinations thereof.

The present shift by wire shifter device 100 comprises a selector 10 that can be actuated by the user for controlling a vehicle transmission. The selector 10 of the shift by wire shifter device 100 is movable relative to a fixed part 20. In the example shown, the fixed part corresponds to a shifter device housing 20. The selector 10 and the housing 20 are both made of one-piece construction in this example.

The selector 10 is mounted on the housing 20 such that the selector 10 can be actuated to perform a first shifting movement defined by a first shifting path P1 that is defined by a straight line and also to perform a second shifting movement defined by a second shifting path P2 that is defined by a curved line. The first and second shifting paths P1, P2 lie on the same plane.

The second shifting movement according to the second shifting path P2 may be performed when the selector 10 is arranged at the upper end of the first shifting path P1 that defines the first shifting movement P1. Intersection between the first shifting path P1 and a second shifting path P2 is at the upper end of the first shifting path P1 and at an intermediate position of the second shifting path P2, as shown in FIG. 7*a*.

The second shifting movement according to the second shifting path P2 may be performed when the selector 10 is arranged at the upper end of the first shifting path P1. Intersection between the first shifting path P1 and the second shifting path P2 is at the upper end of the first shifting path P1 and at the left end of the second shifting path P2, as shown in FIG. 7*b*.

The second shifting movement according to the second shifting path P2 may be performed when the selector 10 is arranged at the upper end of the first shifting path P1. Intersection between the first shifting path P1 and the second shifting path P2 is at the upper end of the first shifting path P1 and at the right end of the second shifting path P2, as shown in FIG. 7*c*.

The second shifting movement according to the second shifting path P2 may be performed when the selector 10 is arranged at the lower end of the first shifting path P1. Intersection between the first shifting path P1 and the second shifting path P1 is at the lower end of the first shifting path P1 and at an intermediate position of the second shifting path P2, as shown in FIG. 7d.

The second shifting movement according to the second shifting path P2 may be performed when the selector 10 is arranged at the lower end of the first shifting path P1. Intersection between the first shifting path P1 and the second shifting path P2 is at the lower end of the first shifting path P1 and at the left end of the second shifting path P2, as shown in FIG. 7e.

The second shifting movement according to the second shifting path P2 may be performed when the selector 10 is arranged at the lower end of the first shifting path P1. Intersection between the first shifting path P1 and the second shifting path P2 is at the lower end of the first shifting path P1 and at the right end of the second shifting path P2, as shown in FIG. 7f.

The second shifting movement according to the second shifting path P2 may be performed when the selector 10 is arranged at an intermediate position of the first shifting path P1. Intersection between the first shifting path P1 and the second shifting path P2 is at the intermediated position of the first shifting path P1 and at the intermediate position of the second shifting path P2, as shown in FIG. 7g.

The second shifting movement according to the second shifting path P2 may be performed when the selector 10 is arranged at an intermediate position of the first shifting path P1. Intersection between the first shifting path P1 and the second shifting path P2 is at the intermediate position of the first shifting path P1 and at the left end of the second shifting path P2, as shown in FIG. 7h.

The second shifting movement according to the second shifting path P2 may be performed when the selector 10 is arranged at an intermediate position of the first shifting path P1. Intersection between the first shifting path P1 and the second shifting path P2 is at the intermediate position of the first shifting path P1 and in the right end of the second shifting path P2, as shown in FIG. 7i.

Other additional examples of combinations of the first and second shifting movements are shown in FIGS. 7j-7k. However, examples other than those shown in FIGS. 7a-7k for the relative movement of the first and second shifting movements P1, P2 are of course not ruled out.

The first and second shifting movements are performed by the selector 10 when actuated by the user into different gearshift positions. The first and second shifting movements are performed according to the above-mentioned corresponding paths P1, P2 that intersect with each other in a stable position in the example shown. The selector 10 is mounted to the housing 20 such that the selector automatically returns to the stable position after the selector 10 has been moved for selecting one gearshift position. When the desired gearshift position has been selected, a gearshift signal is sent to a control unit to drive the vehicle transmission accordingly.

The selector 10 and the housing 20 are directly joined to each other, that is, no other intermediate parts are provided for joining the selector 10 and the housing 20 other than a joint member. In the example shown, the joint member comprises a pivot pin 50 formed in the selector 10 projecting therefrom to slide along a slot 60 formed in the housing 20 as the selector 10 is actuated to perform the first shifting movement according to the first shifting path P1. The pivot pin 50 is also adapted to be rotated in the slot 60 as the selector 10 is actuated to perform the second shifting movement according to the second shifting path P2.

As shown in the drawings and due to the shape of the slot 6, the selector 10 and the shifter device housing 20 are joined such that the first shifting movement is a translational movement defined by the first shifting path P1 as the first shifting path P1 is defined by a straight line, and such that the second shifting movement is a rotational movement defined by the second shifting path P2 relative to the position of the pivot pin 50 as the second shifting path P2 is defined by a curved line. Examples of other different configurations of the first shifting path P1, such as curved, and of the second shifting path P2 such as circular, elliptical, oval or combinations thereof, are also possible.

As stated above, the first shifting movement and the second shifting movement, according to their respective paths P1, P2, are performed in the same plane.

A feeling element 30 is attached to the selector 10 for example through interference fit. The feeling element 30 is configured to provide the user with a gear shifting feeling as the selector 10 is operated for selecting a gear.

In the non-limiting example shown in the figures of the drawings, the feeling element 30 has a first straight-shaped inner channel and a second arch-shaped inner channel, not shown in the drawings. The first inner channel corresponds to the first shifting movement defined by the first shifting path P1 and the second inner channel corresponds to the second shifting movement defined by the second shifting path P2.

Both inner channels may define a T-shaped configuration according to the first and second shifting movements defined by the respective paths P1, P2. Other shapes are of course possible.

Figure 2:
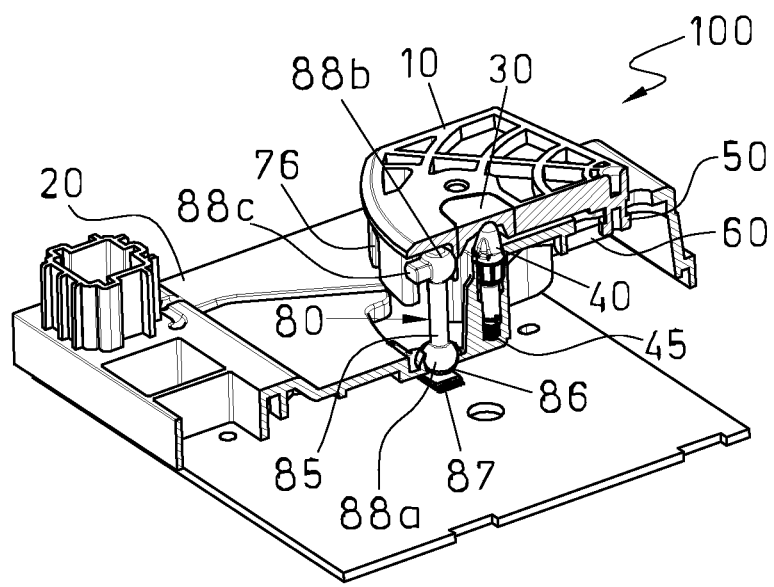
FIG. 2 is a cutaway perspective view of the shift by wire shifter device in FIG. 1.

The second inner channel of the feeling element 30 has a contoured surface that is adapted to be contacted by a follower finger 40. The follower finger 40 is provided in the housing 20 in such a way that the follower finger 40 is biased upwards by a compression spring 45 fitted in the housing 20 as shown in FIGS. 2 and 3 of the drawings. The follower finger 40 is thus biased against a lower portion of the feeling element 30 through the above mentioned second inner channel.

Thus, the first channel of the feeling element 30 is adapted to be contacted by the follower finger 40 as the selector 10 is actuated to perform the first shifting movement according to the first shifting path P1, and the second inner channel of the feeling element 30 is adapted to be contacted by the follower finger 40 as the selector 10 is actuated to perform the second shifting movement according to the second shifting path P2. In both cases, a gear shifting feeling is provided to the user since some resistance is felt when the selector 10 is actuated.

A locking mechanism 70 is also provided. The locking mechanism 70 serves the purpose of locking the selector 10 in certain cases. Specifically, the locking mechanism 70 comprises a projection 75 that is formed in the housing 20. The projection 75 is suitable for moving along a groove 76 formed in the selector 10 as the selector 10 is actuated to perform the first shifting movement according to the first shifting path P1. In this way, the locking mechanism 70 prevents the selector 10 from performing one of the first shifting movement and the second shifting movement as the selector 10 is actuated to perform the other of the first shifting movement and the second shifting movement. For example, the selector 10 is prevented from performing the second shifting movement, that is, from being rotated, as the selector 10 is displaced, i.e., as the selector 10 is actuated to perform the first shifting movement. Thus, the movement of the selector 10 relative to the housing 20 is limited by the feeling element 30 with the follower finger 40, the pivot pin 50 and the groove 76.

A selector position sensing mechanism 80 is also provided in this example, as shown in FIGS. 2 and 3. The selector position sensing mechanism 80 may be preferred as it is of the magnetic type. The selector position sensing mechanism 80 comprises a lever 85 that is attached at both ends thereof to the selector 10 and to the housing 20, a magnet 86 that is attached to the lever 85 at a free end thereof, and a 3D sensor 87 that is connected to a PCB and located proximate the magnet 86 for determining the position of the selector 10 when in use. Attachment of the lever 85 to the selector 10 and to the housing 20 may be carried out by respective first and second ball and socket joints 88a, 88b. At least one of such ball and socket joints 88a, 88b includes a protrusion 88c such that the ball and socket joints 88a, 88b are locked against rotation, as shown in FIGS. 2 and 3.

For controlling a vehicle transmission, the selector 10 can be displaced to perform the first shifting movement according to the first shifting path P1 from the above mentioned stable position, for example, for selecting a neutral N gearshift position. The selector 10 can be also rotated to perform the second shifting movement according to the second shifting path P2 from the stable position, for example, for selecting a reverse R gearshift position or a drive D gearshift position. Other gearshift positions are also possible depending upon the design of the shifter device and the different patterns as shown in FIGS. 7a-k. The 3D sensor 87 of the selector position sensing mechanism 80 determines the position of the selector 10 in the housing 20 and a signal can be output to a vehicle gearbox for controlling the vehicle transmission.

As stated above, the first and second shifting movements of the selector 10 are performed in the same plane, and they are performed with only a single movable part, i.e. the selector 10, that is joined to a fixed part, i.e. the housing 20 with no moving parts involved in the relative movement other than the pivot pin 50. As a result, a simple and efficient shift by wire shifter device 1 is obtained with two different movements of the selector 10 to efficiently control a vehicle transmission.

Although only a number of particular embodiments and examples of the present shift by wire shifter device have been disclosed herein, it will be understood by those skilled in the art that other alternative examples and/or uses and obvious modifications and equivalents thereof are possible. Furthermore, the present disclosure covers all possible combinations of the particular examples described. Thus, the scope of the present disclosure should not be limited by particular examples but should be determined only by a fair reading of the claims that follow.

What is claimed is:

1. A shift by wire shifter device for controlling a vehicle transmission, the device comprising:
    a selector that is movable relative to a fixed part according to a first shifting movement defined by a first shifting path and according to a second shifting movement defined by a second shifting path for selecting gearshift positions;
    at least one of the shifting paths extending from different gearshift positions, wherein the selector and the fixed part are directly joined by a joint member such that the first shifting movement is a translational movement and the second shifting movement is a rotational movement, with the first and second shifting paths lying on the same plane; and
    a feeling element having a contoured surface adapted to be contacted by a follower finger such that as the selector is actuated to perform at least one of the first or second shifting movements, a gear feeling is provided,
    wherein the feeling element comprises:
        a first channel adapted to be contacted by the follower finger as the selector is moved to perform the first shifting movement, and
        a second channel with a contoured surface adapted to be contracted by the follower finger as the selector is moved to perform the second shifting movement.

2. The shifter device of claim 1, wherein the first and second shifting paths define a stable position into which the selector automatically returns after the selector has been moved for selecting one of the gearshift positions.

3. The shifter device of claim 1, wherein the feeling element is attached to or formed integral with one of the selector and the fixed part, and the follower finger is attached to or formed integral with the other of the selector and the fixed part.

4. The shifter device of claim 1, wherein the joint member comprises a pivot pin projecting from one of the selector and the fixed part intended to slide along a slot formed in the other of the fixed part and the selector as the selector is actuated to perform the first shifting movement, the pivot pin being also adapted to be rotated in the slot as the selector is actuated to perform the second shifting movement.

5. The shifter device of claim 1 further comprising a locking mechanism configured to prevent the selector from being actuated to perform one of the first and second shifting movements when the selector is actuated to perform the other of the first and second shifting movements.

6. The shifter device of claim 5, wherein the locking mechanism includes a projection formed in one of the fixed part and the selector and a groove formed in the other of the fixed part and the selector along which the projection can be moved as the selector is actuated to perform the first shifting movement defined by the first shifting path.

7. The shifter device of claim 1, wherein the second shifting path is defined by a path selected from circular, elliptical, and oval.

8. The shifter device of claim 1, wherein the fixed part is formed in or is part of a shifter device housing.

9. The shifter device of claim 1, wherein at least one of the fixed part and the selector is made of one-piece construction.

10. The shifter device of claim 1 further comprising a selector position sensing mechanism including a lever attached to the selector at one end thereof and a magnet attached to the lever at another end thereof, and a sensor located proximate the magnet for determining the position of the selector.

11. The shifter device of claim 10, wherein the sensor is a 3D sensor.

12. The shifter device of claim 10 further comprising a ball and socket joint for coupling of at least one of the lever to the selector and the magnet to the fixed part.

13. The shifter device of claim 12, wherein at least one the ball and the socket joint includes an anti-rotation mechanism.

14. A shift by wire shifter device for controlling a vehicle transmission, the device comprising:
    a selector that is movable relative to a fixed part according to a first shifting movement defined by a first shifting path and according to a second shifting movement defined by a second shifting path for selecting gearshift positions;

at least one of the shifting paths extending from different gearshift positions, wherein the selector and the fixed part are joined by a joint member such that the first shifting movement is translational and the second shifting movement is rotational, with the first and second shifting paths lying on the same plane; and a feeling element having a contoured surface adapted to be contacted by a follower finger such that as the selector is actuated to perform at least one of the first or second shifting movements, a gear feeling is provided, wherein the feeling element comprises:
    a first channel adapted to be contacted by the follower finger as the selector is moved to perform the first shifting movement, and
    a second channel with a contoured surface adapted to be contracted by the follower finger as the selector is moved to perform the second shifting movement.

15. The shifter device of claim 14, wherein the first and second shifting paths define a stable position into which the selector automatically returns after the selector has been moved for selecting one of the gearshift positions.

16. The shifter device of claim 14, wherein the feeling element is attached to or formed integral with one of the selector and the fixed part, and the follower finger is attached to or formed integral with the other of the selector and the fixed part.

17. A shift by wire shifter device for controlling a vehicle transmission, the device comprising:

a selector that is movable relative to a fixed part according to a first shifting movement defined by a first shifting path and according to a second shifting movement defined by a second shifting path for selecting gearshift positions;

at least one of the shifting paths extending from different gearshift positions, wherein the selector and the fixed part are directly joined such that the first shifting movement is a translational movement and the second shifting movement is a rotational movement, with the first and second shifting paths lying on the same plane; and a feeling element having a contoured surface adapted to be contacted by a follower finger such that as the selector is actuated to perform at least one of the first or second shifting movements, a gear feeling is provided, wherein the feeling element comprises:
    a first channel adapted to be contacted by the follower finger as the selector is moved to perform the first shifting movement, and
    a second channel with a contoured surface adapted to be contracted by the follower finger as the selector is moved to perform the second shifting movement.

\* \* \* \* \*